United States Patent [19]
Larson

[11] Patent Number: 5,862,019
[45] Date of Patent: Jan. 19, 1999

[54] DISK DRIVE HEAD ACTUATOR FABRICATION SYSTEM EMPLOYING STANDARDIZED SELF-ALIGNING MODULAR COMPONENTS

[75] Inventor: Nils Eric Larson, San Jose, Calif.

[73] Assignee: Western Digital Corporation, Irvine, Calif.

[21] Appl. No.: 672,146

[22] Filed: Jul. 27, 1996

[51] Int. Cl.⁶ .............................. G11B 5/50; G11B 21/26; H02K 41/00
[52] U.S. Cl. .............................. 360/106; 360/105; 310/13
[58] Field of Search ..................... 360/106, 105, 360/104; 29/603.03, 603.04, 603.06; 310/12, 13, 14

[56] References Cited

U.S. PATENT DOCUMENTS

| | | | |
|---|---|---|---|
| 4,393,425 | 7/1983 | Wright | 360/105 |
| 5,070,423 | 12/1991 | Gloski | 360/106 |
| 5,097,588 | 3/1992 | Fird et al. | 29/603 |
| 5,132,857 | 7/1992 | Russel-Smith et al. | 360/104 |
| 5,184,265 | 2/1993 | Foote et al. | 360/106 |
| 5,293,290 | 3/1994 | Owens et al. | 360/106 |
| 5,299,082 | 3/1994 | Ananth et al. | 360/106 |
| 5,363,262 | 11/1994 | Drennan | 360/106 |
| 5,381,289 | 1/1995 | Fiedler | 360/104 |
| 5,390,058 | 2/1995 | Yamaguchi | 360/104 |
| 5,404,258 | 4/1995 | Arin et al. | 360/106 |
| 5,404,636 | 4/1995 | Stefansky et al. | 29/603 |
| 5,410,794 | 5/1995 | Tucker | 29/281.5 |
| 5,497,282 | 3/1996 | Hoffmann et al. | 360/104 |
| 5,528,091 | 6/1996 | Loubler et al. | 360/106 X |
| 5,557,839 | 9/1996 | Mastache et al. | 29/603.03 |
| 5,691,581 | 11/1997 | Umehara et al. | 310/13 |

*Primary Examiner*—William R. Korzuch
*Attorney, Agent, or Firm*—Leo J. Young; W. Chris Kim; Milad Shara

[57] ABSTRACT

A disk drive actuator assembly adapted for assembly in one of several configurations from a single line of modular components without a manually-supervised aligning step. The actuator improves manufacturability and inertia by introducing a common set of self-aligning modular piece parts. Each of several self-aligning modular components can be used to assemble any of several different actuator assembly designs. That is, a head-stack assembly (HSA) providing from one to six heads can be assembled using elements selected from single set of standardized modular components. The assembly process relies entirely on the self-aligning features of the standardized modular components, thereby eliminating the elaborate and error-prone manual assembly and alignment procedures known in the art.

20 Claims, 7 Drawing Sheets

DISK DRIVE HEAD ACTUATOR FABRICATION SYSTEM EMPLOYING STANDARDIZED SELF-ALIGNING MODULAR COMPONENTS

BACKGROUND OF THE INVENTION

1. Field of the Invention

This invention relates generally to actuators for positioning data sensing heads in a rotary disk drive and specifically to a modular actuator assembly made up of a combination of standardized components.

2. Description of the Related Art

Data storage technology has followed a trend of increasing storage capacity while also decreasing the physical volume occupied by such capacities. Introduction of ever more powerful computer microprocessors and software has contributed to increasing market pressures for ever cheaper, ever larger capacity and ever smaller physical profiles in disk drives. Storage device manufacturers strive to achieve any possible incremental cost savings that can be reasonably achieved without loss of technical performance.

Figure 1:
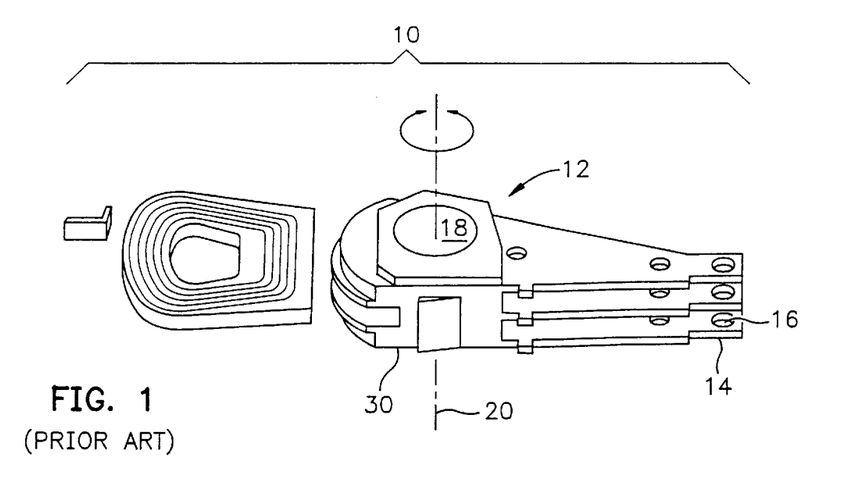
FIG. 1 shows a perspective view depicting a common disk drive actuator from the prior art.

A key aspect in reducing manufacturing costs for disk drives is improving the manufacturability of disk drive components. Among others, disk drive components include read/write heads for recording and retrieving data from a storage disk and a head actuator assembly for positioning the heads with respect to the storage disk. Such actuators may be either linear or rotary, each having specific advantages for the particular application. In magnetic disk drives, the rotary or "swing-type" actuator assembly is most commonly used. The over-riding requirement for advancing the actuator assembly art is widely believed to be improved ease of manufacturability without losing reliable performance. FIG. 1 represents a typical swing-type actuator assembly 10 known in the art as the E-block actuator assembly.

As seen in FIG. 1, actuator assembly 10 includes an E-block 12 fabricated by machining an aluminum or magnesium casting or extrusion. E-block 12 includes one or more actuator arms exemplified by actuator arm 14. A head suspension (not shown) is fixed to the end of each such actuator arm at a position exemplified by the swaging hole 16 on actuator arm 14. E-block 12 also includes a pivot bore hole 18 disposed to receive a pivot bearing assembly (not shown) for supporting rotation of actuator assembly 10 about a pivot axis 20. As actuator assembly 10 rotates back and forth about pivot axis 20, each of several read/write heads (not shown) disposed on suspensions (not shown) fixed at the several actuator arm swaging holes exemplified by swaging hole 16, swings across the data recording tracks of a rotary magnetic disk (not shown) in the manner well-known in the art for such swing-type actuator assemblies.

E-block 12 is usually fabricated from cast or extruded aluminum or magnesium that is machined to provide the requisite attachment points for head suspensions, pivot bearing assembly, latch components and voice coil motor components. Head suspensions are usually attached to the actuator arm tips by swaging or staking through machined holes in the E-block arms (e.g., the hole at location 16). Accurate maintenance of the specified dimensional relationships of E-block 12, head suspensions and heads is very important to proper disk drive performance.

The actuator assembly 10 shown in FIG. 1 suffers from well-known cost and manufacturability problems. E-block 12 is expensive to manufacture. The alignment and seating of the head suspensions and heads must be manually supervised by a technical worker, thereby increasing assembly manufacturing costs and reducing manufacturing yield.

Practitioners in the art have addressed these problems with many proposals for incremental improvement to the actuator assembly design typified by actuator assembly 10 in FIG. 1. For instance, In U.S. Pat. No. 5,382,851, Robert Loubier discloses a different swing-type actuator assembly of the type exemplified by the actuator assembly 22 in FIG. 2. Actuator assembly 22 encapsulates a coil carrier 26 and individual metallic actuator arms exemplified by the actuator arm 24 into a central plastic body 28 to eliminate the heavy central portion 30 (FIG. 1) of E-block 12. But a coil-block joint flexure problem known in the art is exacerbated because most of E-block central portion 30 is replaced with plastic, thereby perhaps introducing more flexibility in the alignment between coil carrier 26 and the actuator arm plurality 32. Also, pivot-axis runout is increased because of increased flexibility at the inner surface of the bore hole 36. Loubier molds a separate metal journal 34 into plastic pivot body 28 at bore hole 36 in an attempt to rigidly couple pivot axis 20 to body 28 and to electrically couple actuator arm plurality 32 for static charge purposes. Disadvantageously, the precise alignment of actuator arm plurality 32 needed for this configuration requires jigging or drilling steps additional to those required with monolithic aluminum E-block configurations.

Thus, as is well known in the art, the requirements for head actuator assembly rigidity and alignment precision often require solutions that trade for increased actuator inertia and reduced manufacturability. Even the partially molded head actuator assembly 22 shown in FIG. 2 requires human supervision of alignment during manufacture.

Figure 2:
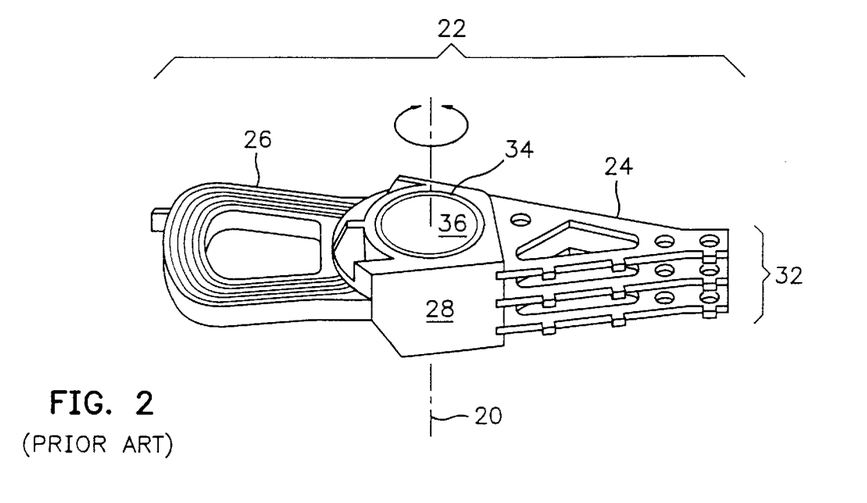
FIG. 2 shows a perspective view of a low-inertia actuator from the prior art.

The known actuator assembly fabrication techniques illustrated in FIGS. 1–2 are not convenient for use in manufacturing a series of multi-platter disk drives of various numbers of disks. Each actuator assembly is optimized for use in only one specific disk drive design. For instance, consider that a four-arm actuator assembly (with six head suspensions) is specially designed and assembled for use in a three-platter disk drive. Although the four-arm actuator assembly could arguably be used without modification in a one- or two-platter disk drive by omitting the unused head suspensions, the result gives unnecessarily high inertia (mass) and component count (cost). That is, by simplifying manufacturing procedures through using a, for example, four-arm actuator assembly design in all one-, two-, or three-platter disk drive products, any prospective manufacturing savings from eliminating multiple actuator designs are lost to unnecessary and unwanted actuator inertia (lower performance) and component count (higher cost) in many of the disk drive designs. No particular actuator assembly design can be used in multiple disk drive designs without sacrificing either performance or cost or both.

Various practitioners have proposed other solutions to the actuator assembly manufacturability problem. For instance, in U.S. Pat. No. 5,410,794, Larry Tucker discloses a manufacturing tool for holding head-stack assembly (HSA) components during manual assembly. Tucker's tool provides for positioning the head-stack components including two pairs of actuator arm assemblies, associated spacers and a flat coil member, in an aligned relationship to permit a pivot bearing to be inserted through an opening in each component adapted to receive the bearing. Tucker neither considers nor suggests means for self-aligning assembly of several different actuator designs using standardized components.

In U.S. Pat. No. 5,363, 262, George Drennan discloses an actuator assembly in which only flexible integral load beams are used in the arm-stack structure. The load beams are assembled in a stack on a tubular actuator member together with the moveable coil member of the actuator motor or other actuator drive mechanism, and after alignment are secured to the tubular member to form a separate actuator assembly. Drennan's invention eliminates unnecessary armstack and actuator structure between the HSA and the moving coil carrier portion of the actuator motor, thereby eliminating substantial inertia from the actuator. However, Drennan neither considers nor suggests means for the self-aligning assembly of standardized components to form one of a variety of different actuator designs.

In U.S. Pat. No. 5,404,636, Stefansky et al. disclose a disk drive actuator assembly method similar to Drennan's teachings. Stefansky et al. teach a method for assembling an actuator from a selection of modular components by stacking a first and a second actuator arm in an orientation where the axis of the arms are non-parallel, inserting comb assembly between the first and second arms, rotating the arms about the assembly member until disposed in parallel, and finally securing the arms against rotation relative to one another. Although Stefansky et al. for the first time proposed the use of standardized arm and actuator components as one method for improving manual alignment of head suspensions during staking to the E-block in the assembly process, they neither consider nor suggest means for self-aligning of components during the assembly of one of several different actuator designs.

In U.S. Pat. No. 5,299,082, Ananth et al. disclose an apparatus and method for pre-loading the outer most head suspensions in an actuator HSA to compensate for the absence of a second head suspension in each of the two outer actuator arms. Thus, Ananth et al. propose a solution to the pre-load imbalance problem arising from the presence of two head suspensions fixed to each of several interior actuator arms and a single head suspension attached to each of two outer actuator arms in a HSA. However, Ananth et al. neither consider nor suggest solutions to the modular assembly problem nor to the problem of using standardized components to manufacture several different actuator assembly designs.

In U.S. Pat. No. 5,070,423, David Gloski discloses a high-performance actuator array employing independently-driven reciprocating carriage arms. Although Gloski's actuator array uses modular components, he neither considers nor suggests the self-aligning automated manufacture of rotary actuator assemblies.

In U.S. Pat. No. 5,293,290, Owens et al discloses a modular, stackable, linear actuator using embedded coil carriages. Like Gloski, Owens et al. neither consider nor suggest solutions to the rotary actuator manufacturability problem.

Other solutions to the twin head suspension pre-load balancing problem are suggested in U.S. Pat. No. 5,381,289 by Richard Fiedler and in U.S. Pat. No. 5,390,058 by Akihiko Yamaguchi. Like Ananth et al., neither Fiedler nor Yamaguchi consider or suggest solutions to the self-aligning modular actuator manufacturability problem.

Without solutions to the increased manufacturing complexity needed to reduce actuator inertia without losing requisite rigidity and for other disadvantages of the molded plastic actuator assembly known in the art, practitioners are obliged to accept unwanted new fabrication costs to obtain a desired reduction in actuator rotational inertia. Certain of these unresolved problems and deficiencies are clearly felt in the art and are solved by this invention in the manner described below.

SUMMARY OF THE INVENTION

The actuator of this invention solves the above manufacturability and inertia problems by introducing for the first time a common set of self-aligning modular piece parts. Each of several self-aligning modular components can be used to assemble any of several different actuator assembly designs. That is, a head-stack assembly (HSA) providing from one to six heads can be assembled using a minimal number of standardized modular components. The assembly process of this invention for the first time relies on self-aligning features of the standardized modular components, thereby eliminating the elaborate and error-prone manual assembly and alignment procedures known in the art.

It is an object of this invention to provide an actuator assembly that can be assembled from standardized parts without manual alignment. It is a feature of this invention that each of the several different actuator assembly configurations can be manufactured from the same standardized components without manual alignment during manufacture. In a preferred embodiment of this invention, the standardized self-aligning modular components include an actuator core module having a fixed support arm coupled to a body that includes receiving means for coupling to a pivot bearing module, a motor coil module including means for coupling in a pre-determined orientation to the body of an actuator core module, and an additional support arm module including means for coupling in a pre-determined orientation to the body of an actuator core module.

It is another object of this invention to simplify the process of manufacturing an actuator assembly. It is a feature of the actuator assembly of this invention that no central tubular hub element is required for coupling to a pivot bearing module defining an actuator pivot access disposed for coupling to a disk drive base. It is another feature of the modular components of this invention that multiple actuator embodiments can be assembled from the same standardized modular components. It is yet another feature of the actuator assembly of this invention that all standardized components include means for coupling in a pre-determined alignment with one another, thereby eliminating the manual alignment step from the manufacturing procedure.

It is a further object of the actuator assembly of this invention to provide for reduced rotational inertia. It is an advantage of the modular components of this invention that attaching the additional support arm module after molding the actuator core module allows for the reduction for plastic material in the actuator core module body by omitting core material under the outer module support arms. That is, the pre-aligned staking assembly procedure of this invention eliminates the requirement for fully-molded core elements, thereby permitting selective omission of molding material (to reduce mass) throughout the standardized modular elements of this invention.

Finally, it is yet another object of this invention to provide for multiple actuator assembly embodiments from a single standardized set of modular components. It is a feature and advantage of the single set of standardized modular components of this invention that a two-head actuator assembly can be created using a single actuator core module and a single additional support arm module; a four-head assembly can be provided using a single actuator core module and two additional support arm modules, and a six-head actuator assembly can be created using two actuator core modules and two additional support arm modules. Other actuator assembly embodiments may also be created from the same standardized modular components, as described hereinbelow.

The foregoing, together with other objects features and advantages of this invention, can be better appreciated with reference to the following specification, claims, and the accompanying drawing.

BRIEF DESCRIPTION OF THE DRAWING

For a more complete understanding of this invention, reference is now made to the following detailed description of the embodiments as illustrated in the accompanying drawing, in which like reference designations represent like features and wherein.

DETAILED DESCRIPTION OF THE PREFERRED EMBODIMENTS

Figure 3:
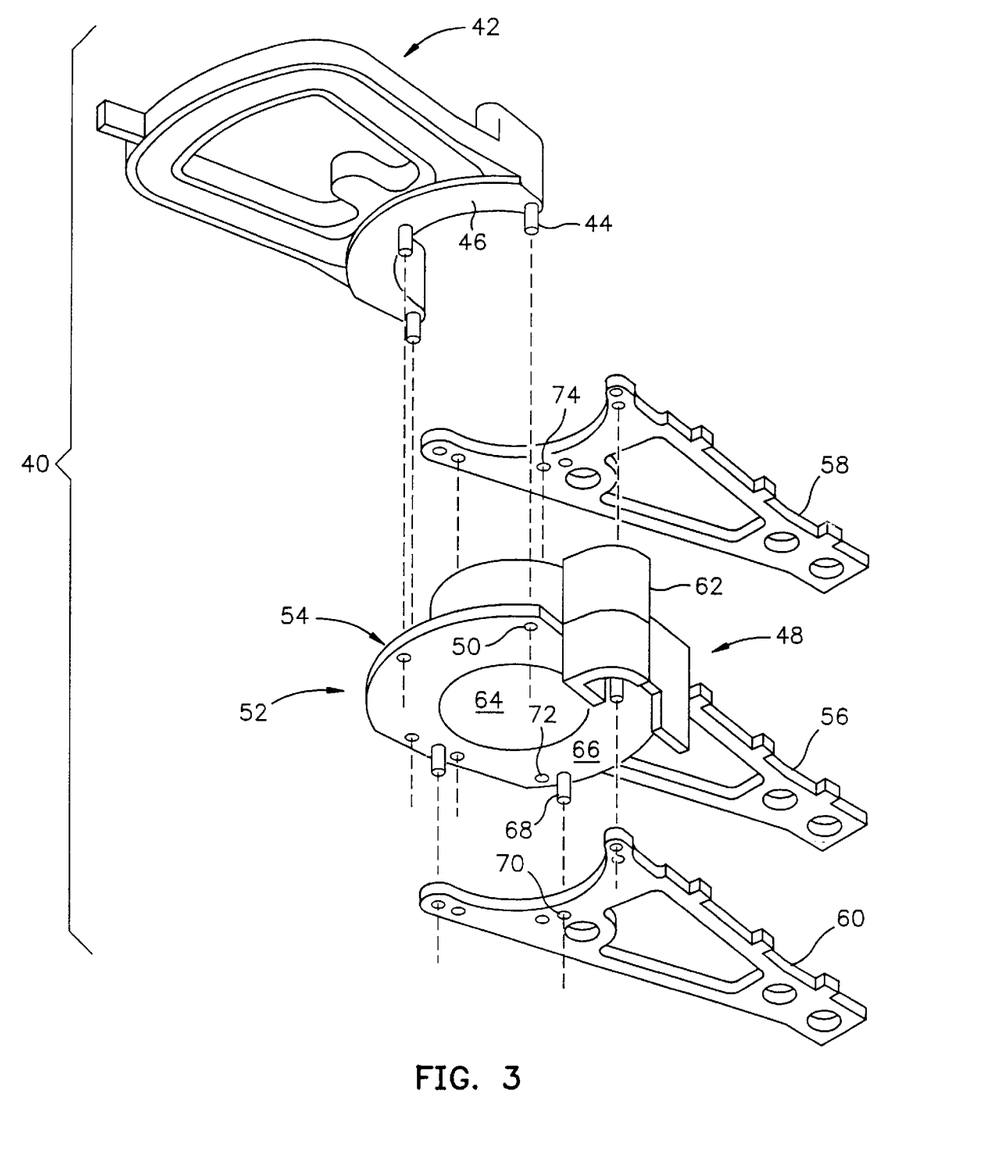
FIG. 3 shows an exploded perspective view of a low-inertia three-arm actuator assembly according to this invention.

FIG. 3 shows an exemplary three-arm actuator assembly 40 fabricated in accordance with this invention. In the exemplary three-arm embodiment shown, the motor coil module 42 is designed and constructed according to engineering principles known in the art to provide balance compensation for the remainder of the three-arm actuator assembly. The low moment-of-inertia and seek-time performance requirements for actuator assembly 40 are achieved by adjusting the mass distribution in modular motor coil module 42 to compensate for and to balance out against the particular components making up the remainder of assembly 40. Preferably, motor coil module 42 is molded of a rigid plastic with the motor coil (not shown) over-molded therein. Several staking bosses, exemplified by the staking boss 44, are provided on a lower planar surface 46 of motor coil module 42. The staking bosses are disposed to mate with matching staking holes in the actuator core module 48. For instance, staking boss 44 is aligned to mate with staking hole 50 in actuator core module 48.

Actuator core module 48 is preferably molded of a rigid thermoplastic and includes a body portion 52 having a coil assembly support region 54 with a plurality of staking holes (exemplified by staking hole 50) for use in receiving and mating with the staking bosses (exemplified by staking boss 44) of motor coil module 42. Additionally, actuator core module 48 includes a fixed support arm 56, preferably over-molded, fixedly aligned with respect to the staking bosses and holes therein as described below. Fixed support arm 56 is preferably identical to the additional support arm modules 58 and 60 so that arms 56, 58, and 60 may all be fabricated identically from either metal (such as a stamped sheet metal) or a rigid plastic. Even so, fixed support arm 56 is permanently fixed to body portion 52 of actuator core module 48 such that it is aligned with additional support arm modules 58 and 60 when they are staked to actuator core module 48 as described below.

Figure 4:
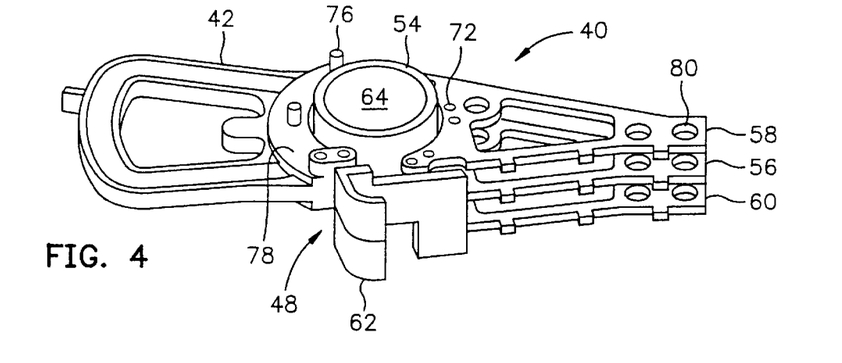
FIG. 4 shows a perspective view of the fully-assembled three-arm actuator assembly of FIG. 3.
Figure 9:
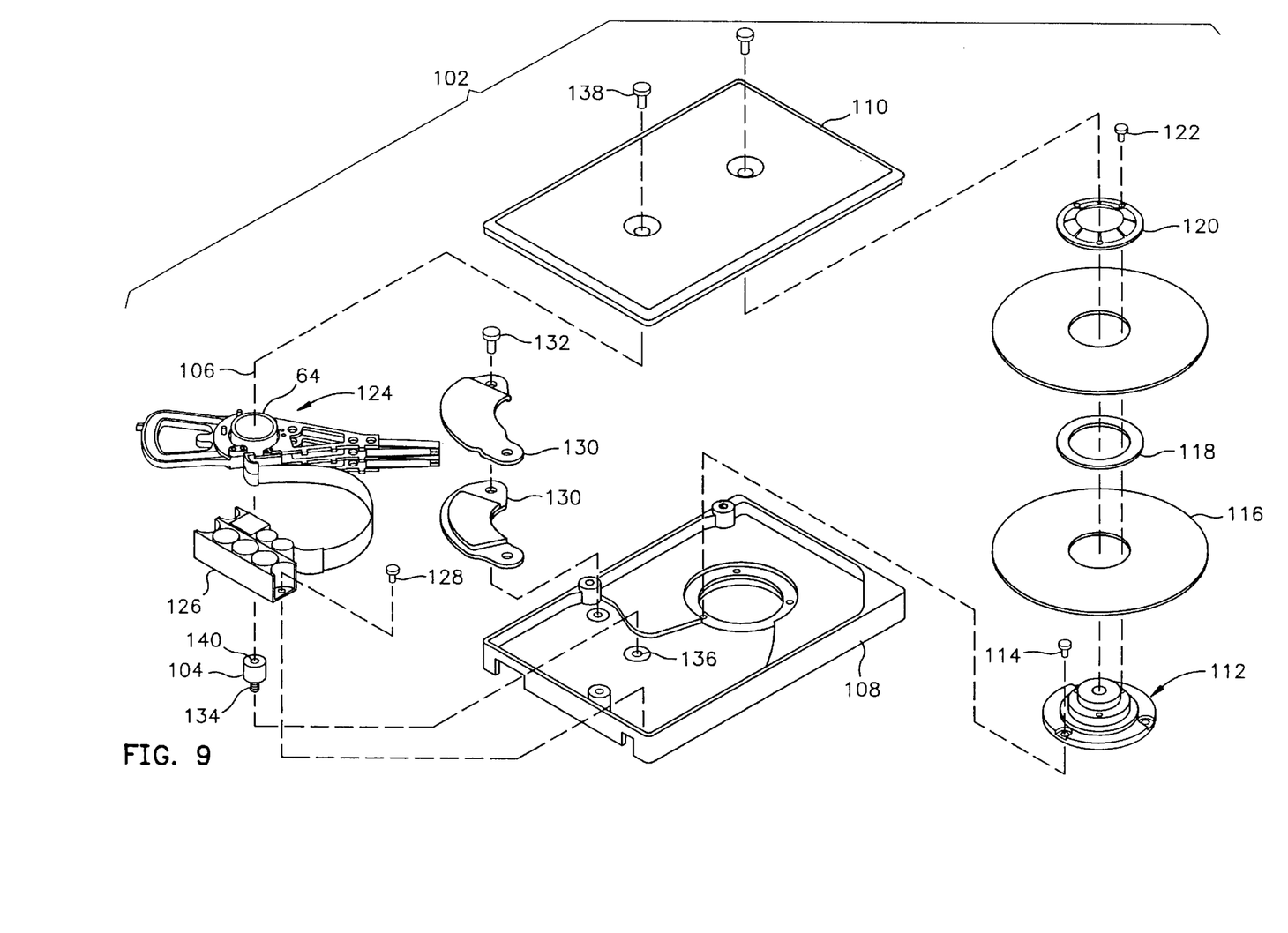
FIG. 9 shows an exploded perspective view of a rotary disk drive incorporating the actuator assembly of this invention.

Actuator core module 48 further provides an input-output circuit support 62 for use in the connecting and routing of flex circuits (not shown) or the like to actuator assembly 40 (see FIG. 9). Actuator core module 48 also includes a bore hole 64 disposed to accept and retain a pivot bearing module 104 (FIG. 9) for establishing a fixed actuator pivot axis 106 (FIG. 9). Body portion 52 includes a lower planar surface 66 having a plurality of staking bosses (exemplified by the staking boss 68) disposed to align and mate with matching staking holes (exemplified by the staking hole 70) in lower additional support arm 60. As seen in FIG. 4, body portion 52 further includes an upper planar surface 78 opposite lower planar surface 66 that also provides a plurality of staking bosses (exemplified by the staking boss 72) disposed to mate with matching staking holes (exemplified by the staking hole 74) in additional support arm module 58.

In the exemplary embodiment shown in FIG. 3, three staking bosses are provided on surfaces 66 and 78 of body portion 52 for mating with three corresponding staking holes in additional support arm modules 58 and 60. The upper staking bosses (exemplified by staking boss 72) are each seen to be offset slightly from the proximate lower staking boss (exemplified by staking boss 68). For uniformity and modularity, each additional support arm module 58 and 60 is provided with three pairs of staking holes. Each pair includes a hole disposed to mate in proper alignment with either upper or lower staking boss (exemplified by staking bosses 72 and 68, respectively). This arrangement ensures proper alignment after assembly of upper and lower additional support arm modules 58 and 60 with respect to fixed support arm 56 without human supervision during assembly, in accordance with this invention.

Figure 5:
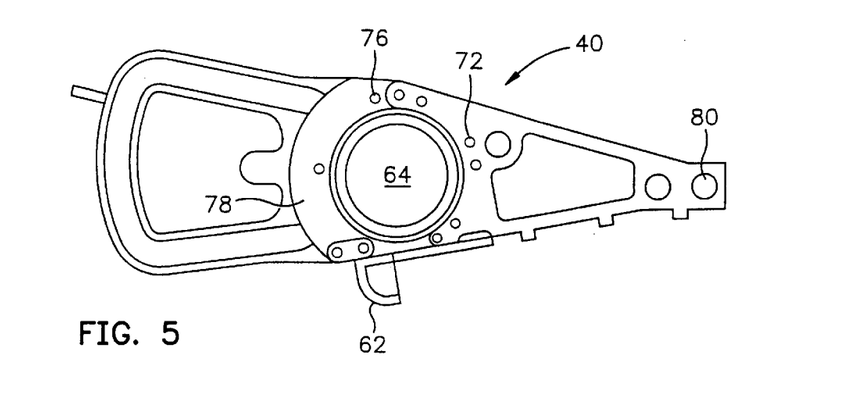
FIG. 5 shows a top view of the actuator assembly of FIG. 3.

FIG. 4 shows an oblique view of the top of three-arm actuator assembly 40 from FIG. 3 and FIG. 5 shows a top plan view of three-arm actuator assembly 40. Note that additional staking bosses (exemplified by the staking boss 76) may be provided on an upper planar surface 78 of motor coil module 42 to facilitate the self-aligned mating of a second actuator core module 78 (FIG. 6) with motor coil module 42 and actuator core module 48. Because only the one actuator core module 48 is required in three-arm actuator assembly 40, these upper bosses (exemplified by staking boss 76) are shown as unused in FIG. 4–5.

Figure 8A:
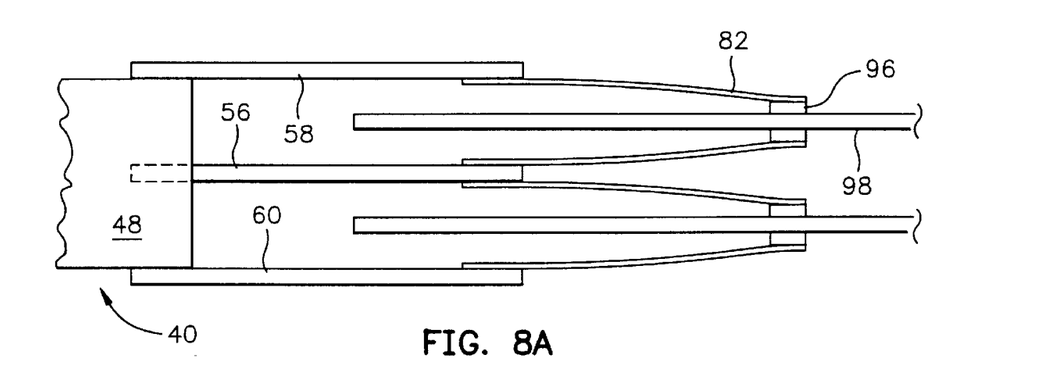
FIGS. 8A, 8B, 8C and 8D provide a side view of several actuator assemblies according to this invention shown in association with various numbers of related head suspensions and rotary disks.

Each of support arms 60, 56 and 58 are also provided with swaging holes (exemplified by the swaging hole 80 in support arm 58) for use in swaging thereto either one or two head suspensions exemplified by the head suspension 82 shown coupled to support arm 58 (FIG. 8A).

Figure 6:
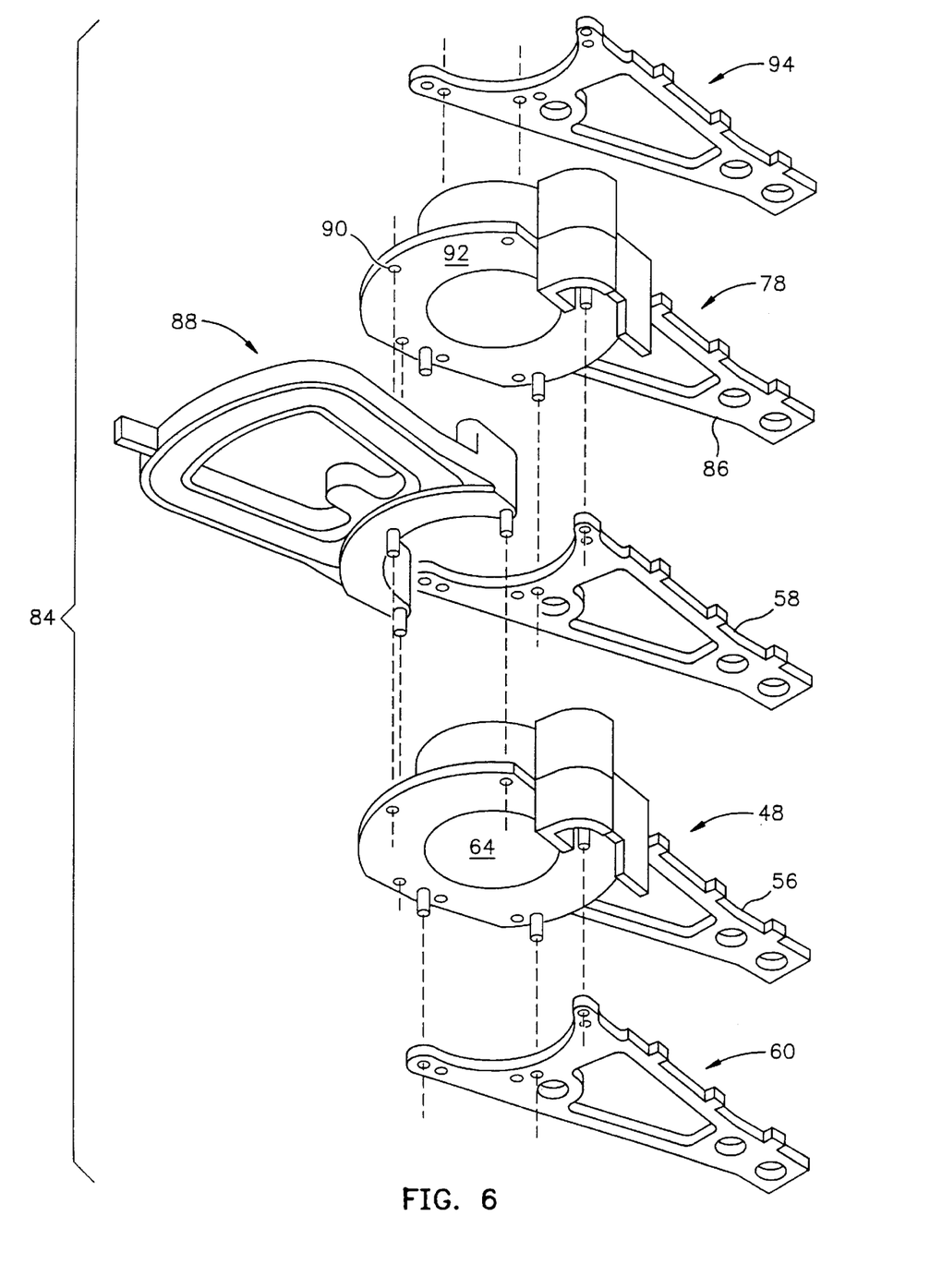
FIG. 6 shows an exploded perspective view of a low-inertia five-arm actuator assembly according to this invention.

FIG. 6 provides a second exemplary embodiment of this invention, which is a five-arm actuator assembly 84. Five-arm actuator assembly 84 may be generally appreciated by analogy with reference to the above discussion of three-arm actuator assembly 40 in connection with FIG. 3. Similar numerals represent similar elements in both FIGS. 3 and 6. FIG. 6 shows a fourth arm added by a second actuator core module 78 as the fixed actuator arm 86 and a fifth arm added as the additional support module arm 94. Significantly, the motor coil module 88 shown in FIG. 6 may differ from motor coil module 42 shown in FIG. 3 according to the method of this invention. This difference may be necessary to adjust the balance compensation offsetting the inertial moments of fourth and fifth arms 86 and 94. Such balance compensation may also be obtained by appropriate specification of the remainder of second core module 78. Adjustments to the mass of motor coil module 42 can be effected by changing the coil material to one of another density (e.g., changing aluminum wire to copper wire) and/or changing dimensions of the coil module elements (e.g., changing wire diameter or the number of turns). The resin material may also be changed to effect this mass adjustment.

Figure 7:
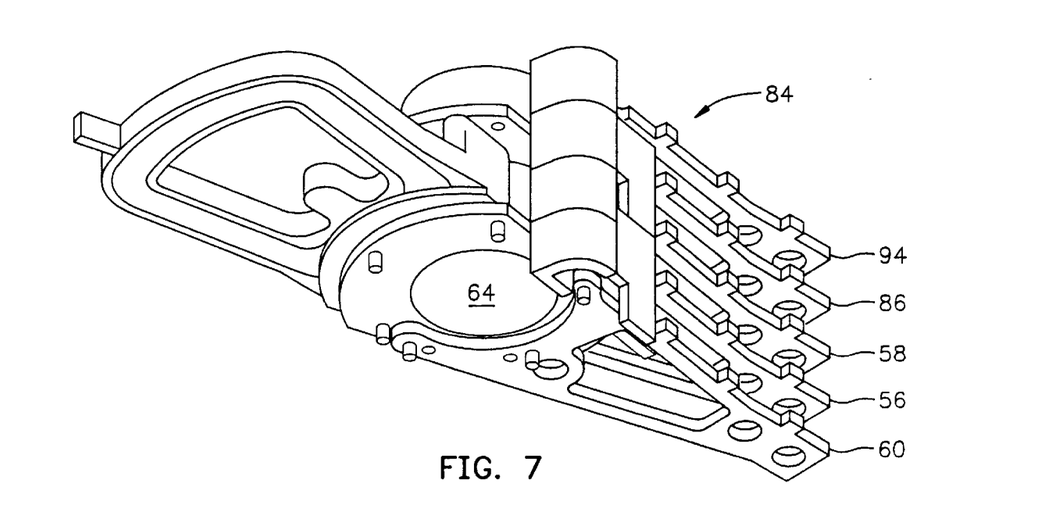
FIG. 7 shows a perspective view of the fully-assembled five-arm actuator assembly of FIG. 6.

As mentioned above in connection with FIGS. 4–5, motor coil module 88 includes several staking bosses (exemplified by the staking boss 76) on an upper planar surface 78 shown on core module 42 in FIGS. 4–5. These upper staking bosses are disposed to mate in alignment with the staking holes (exemplified by staking hole 90) in a lower planar surface 92 of actuator core module 78. FIG. 7 provides an oblique view of five-arm actuator assembly 84 from FIG. 6 showing it as fully-assembled.

Figure 8B:
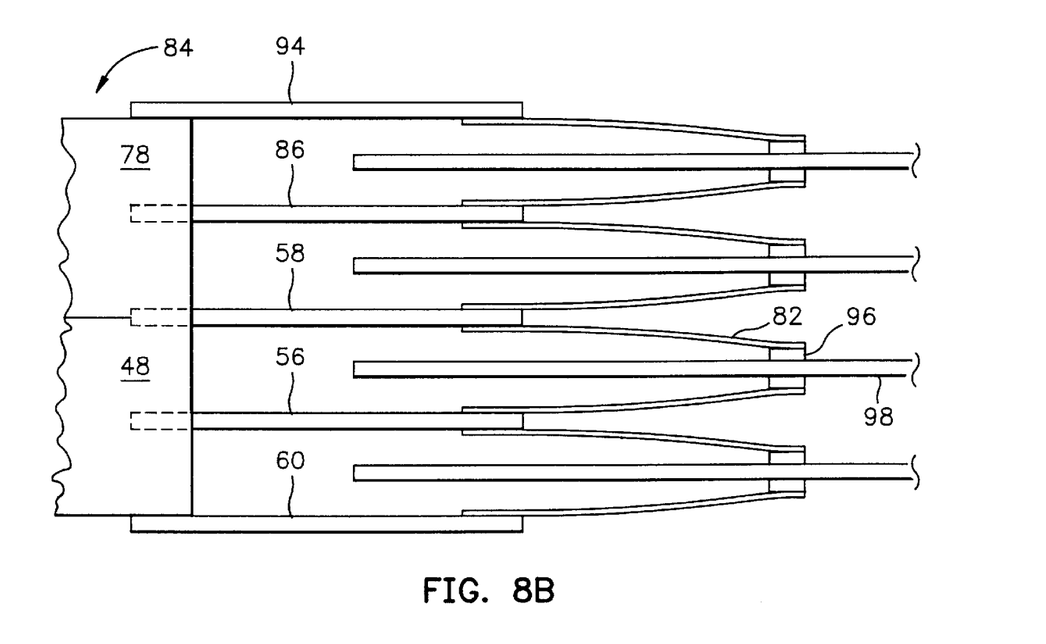
Figure 8C:
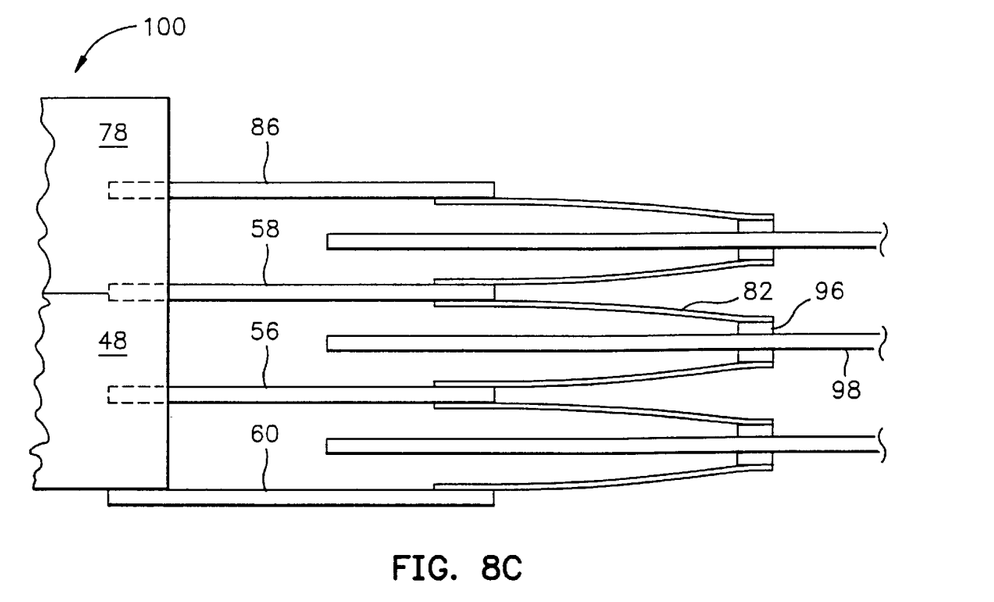

A four-arm embodiment of actuator assembly 84 can be created simply by omitting additional support arm module 94 from assembly 84 to produce the actuator assembly 100 (FIG. 8C). Alternatively, a four-arm actuator assembly 101 (FIG. 8D) can be created by assembling two core modules 48C and 78C that are respecified to relocate the fixed support arms 56C and 86C as necessary to equalize inter-arm spacing. The associated motor coil module (not shown) may be adjusted in mass and/or size to compensate for the reduced actuator arm inertial moment in accordance with the teachings of this invention.

FIGS. 8A–8B show a schematic representation of the two actuator assembly embodiments 40 and 84 discussed above showing the attached head suspensions in engagement with the associated rotary disks. In FIG. 8A, three-arm actuator assembly 40 from FIGS. 3–5 is shown schematically with head suspensions (exemplified by head suspension 82 attached to support arm module 58) attached at the end of each arm 60, 56 and 58 in the manner required to dispose a read/write head (exemplified by the read/write head 96) on a corresponding rotary disk surface (exemplified by the upper surface of the disk 98) in a two-disk stack. Three-arm actuator assembly 40 is configured to provide the four read/write heads (exemplified by head 96) needed to address the four surfaces of two disks (exemplified by the upper surface of disk 98). Similarly, in FIG. 8B, five-arm actuator assembly 84 from FIGS. 6–7 is shown schematically with head suspensions (exemplified by head suspension 82 attached to support arm module 58) attached at the end of each arm 60, 56, 58, 86 and 94 in the manner required to dispose a read/write head (exemplified by read/write head 96) on a corresponding rotary disk surface (exemplified by the upper surface of disk 98) in a four-disk stack.

Figure 8D:
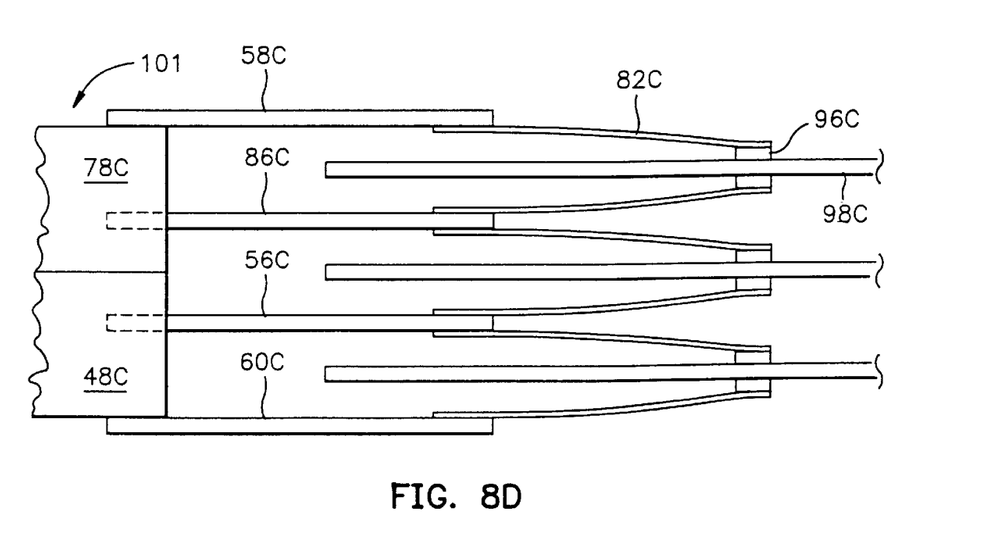

FIGS. 8C and 8D provide schematic representations of the two exemplary four-arm actuator assembly embodiments mentioned above. In FIG. 8C, actuator assembly 100 is seen merely as actuator assembly 84 (FIG. 8B) with fifth support arm module 94 omitted. This is the preferable method of this invention for producing actuator assemblies having an even number of arms. Alternatively, and less preferably, where a first actuator core module (such as module 78) is specified for all actuator assemblies with an odd number of actuator arms, a second actuator core module design (such as module 78C) may be specified for all actuator assemblies having an even number of actuator arms. Such a second actuator core module design incorporates a fixed support arm axially offset to provide the proper inter-arm spacing of fixed support arms 56C and 86C as shown in FIG. 8D. Also, in FIG. 8D, support arms 58C and 60C, head suspension 82C, read/write head 96C, and disk 98C are shown.

The modular elements of this invention are preferably coupled to one another by fusing the staking bosses to the staking holes after the actuator is assembled in the manner discussed above. The fused joints may be obtained either through the use of press-fit dimensions, adhesives or through thermal or ultrasonic fusing in any useful manner known in the art. Any one or several of the basic modular components, such as motor coil module 42, actuator core module 48, alternate actuator core module 48C or additional support arm module 58, may be fabricated as a single molded piece of thermoplastic resin in any useful manner known in the art. Alternatively, the actuator support arms may be separately fabricated from metal or plastic and over-molded by a thermoplastic body portion 52 to form actuator core module 48.

Based on these teachings, practitioners in the art can readily appreciate that the modular actuator assembly of this invention may be fabricated with an actuator core module having more than one over-molded or integral fixed support arm protruding therefrom for use in applications where no fewer than two rotary disks (having four recording surfaces) are employed. Moreover, another alternative embodiment of the actuator core module of this invention may be employed having no support arm protruding therefrom but including only the necessary staking bosses for mounting upper and/or lower support arms as needed may also be provided as an additional standardized modular element to accommodate low cost single-disk drives requiring an actuator assembly having only two support arms.

Thus, there is described a modular actuator assembly for a disk drive that includes an assemblage of standardized modular elements whereby actuator assemblies of variable configuration may be assembled through an automated self-aligning fabrication process.

FIG. 9 shows an exploded perspective view of a disk drive 102 incorporating actuator assembly 48 of this invention as part of the head stack assembly 124. A pivot bearing assembly 104 is shown coupled to bore hole 64 of actuator assembly 48 to establish pivot axis 106. Disk drive 102 includes base 108, a drive housing cover 110, a disk motor assembly 112 with the fasteners 114 for securing motor assembly 112 to base 108, a plurality of storage disks exemplified by disk 116, a storage disk spacer 118, a disk assembly clamp 120 and the fasteners 122 for securing the disk array to motor assembly 112, a portion of head stack assembly 124 including read/write electronics module 126, a fastener 128 for securing read/write module 126 to base 108, and an actuator magnet assembly 130 with the fasteners 132 for securing actuator magnet assembly 130 to base 108. Pivot bearing assembly 104 is secured to base 108 by turning a threaded end 134 into a threaded hole 136. A fastener 138 is also passed through cover 110 and turned into a threaded hole 140 in the top of pivot assembly 104, thereby firmly securing pivot bearing assembly 104 to both top and bottom of disk drive 102. Head stack assembly 124 is fixed to pivot bearing assembly 106 so that actuator motor assembly 130 can swing head stack assembly 124 back and forth about pivot axis 106 to move read/write heads (e.g., read/write head 96 shown in FIGS. 8A–C) into position with respect to the surfaces of the rotary disks exemplified by disk 116.

Clearly, other embodiments and modifications of this invention may occur readily to those of ordinary skill in the

We claim:

1. A rotary actuator assembly for a disk drive, the disk drive having a base and a pivot bearing module fixed to the base, the rotary actuator assembly comprising:
   a support arm module;
   a motor coil module;
   an actuator core module comprising:
      a body portion including:
         a bore hole having a pivot axis, the bore hole for receiving the pivot bearing module;
         a coil assembly support region;
         a plurality of lower arm staking means; and
         a plurality of upper arm staking means positioned above the lower arm staking means, each of the upper arm staking means being circumferentially offset relative to each corresponding lower arm staking means, the circumferential offset being relative to the pivot axis such that either arm staking means is used for connecting the actuator core module to the support arm module and the circumferential offset allows stacking of another actuator core module into the rotary actuator assembly;
      a fixed support arm coupled to the body portion; and
   the motor coil module and the coil assembly support region defining staking means for connecting the motor coil module to the coil assembly support region.

2. The rotary actuator assembly of claim 1 wherein the lower and upper arm staking means each includes a plurality of staking bosses.

3. The rotary actuator assembly of claim 2 wherein the body portion further includes an input-output circuit support, one of the staking bosses of the lower arm staking means extending from the input-output circuit support.

4. The rotary actuator assembly of claim 1 wherein the support arm module includes arm staking means for connecting the support arm module to the actuator core module.

5. The rotary actuator assembly of claim 4 wherein the arm staking means of the support arm module includes three pairs of staking holes, a staking hole from each pair for connecting the support arm module to the lower arm staking means and the other staking hole from each pair for connecting the support arm module to the upper arm staking means.

6. The rotary actuator assembly of claim 1 wherein the support arm module is connected to the lower arm staking means and further comprising:
   another support arm module, the another support arm module connected to the upper arm staking means.

7. The rotary actuator assembly of claim 6 further comprising:
   another actuator core module coupled to the actuator core module.

8. The rotary actuator assembly of claim 1 wherein the coil assembly support region is perpendicular to the pivot axis and wherein the staking means defined by the motor coil module and the coil assembly support region includes a plurality of staking bosses and staking holes.

9. The rotary actuator assembly of claim 8 wherein the staking bosses are positioned on the motor coil module.

10. The rotary actuator assembly of claim 1 wherein the actuator core module is made from thermoplastic material and the support arm module is made from either metal or plastic.

11. A disk drive comprising:
   a base;
   a rotary actuator assembly comprising:
      a support arm module;
      a motor coil module;
      an actuator core module comprising:
         a body portion including:
            a bore hole having a pivot axis;
            a coil assembly support region;
            a plurality of lower arm staking means; and
            a plurality of upper arm staking means positioned above the lower arm staking means, each of the upper arm staking means being circumferentially offset relative to each corresponding lower arm staking means, the circumferential offset being relative to the pivot axis such that either arm staking means is used for connecting the actuator core module to the support arm module and the circumferential offset allows stacking of another actuator core module into the rotary actuator assembly;
         a fixed support arm coupled to the body portion;
      the motor coil module and the coil assembly support region defining staking means for connecting the motor coil module to the coil assembly support region; and
   a pivot bearing module fixed to the base and positioned within the bore hole.

12. The disk drive of claim 11 wherein the lower and upper arm staking means each includes a plurality of staking bosses.

13. The disk drive of claim 12 wherein the body portion further includes an input-output circuit support, one of the staking bosses of the lower arm staking means extending from the input-output circuit support.

14. The disk drive of claim 11 wherein the support arm module includes arm staking means for connecting the support arm module to the actuator core module.

15. The disk drive of claim 14 wherein the arm staking means of the support arm module includes three pairs of staking holes, a staking hole from each pair for connecting the support arm module to the lower arm staking means and the other staking hole from each pair for connecting the support arm module to the upper arm staking means.

16. The disk drive of claim 11 wherein the support arm module is connected to the lower arm staking means and further comprising:
   another support arm module, the another support arm module connected to the upper arm staking means.

17. The disk drive of claim 16 further comprising:
   another actuator core module coupled to the actuator core module.

18. The disk drive of claim 11 wherein the coil assembly support region is perpendicular to the pivot axis and wherein the staking means defined by the motor coil module and the coil assembly support region includes a plurality of bosses and staking holes.

19. The disk drive of claim 18 wherein the staking bosses are positioned on the motor coil module.

20. The disk drive of claim 11 wherein the actuator core module is made from thermoplastic material and the support arm module is made from either metal or plastic.

* * * * *